Dec. 22, 1964     R. E. DWYER     3,162,516
METHOD OF FILTERING EXHAUST GASES
Filed Aug. 14, 1961
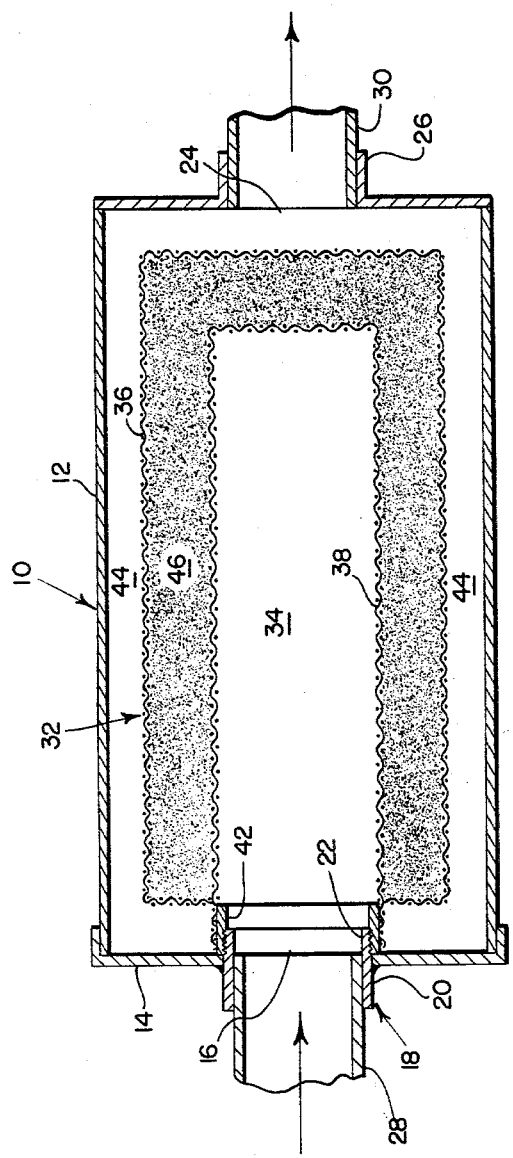
INVENTOR.
RICHARD E. DWYER
BY
*Wilfred J Baranick*
ATTORNEY

United States Patent Office 3,162,516
Patented Dec. 22, 1964

3,162,516
METHOD OF FILTERING EXHAUST GASES
Richard E. Dwyer, 173 Adams St., Dedham, Mass.
Filed Aug. 14, 1961, Ser. No. 131,130
4 Claims. (Cl. 55—98)

This invention relates to the treatment of gases and, more particularly, to the treatment or filtration of hot exhaust gases to prevent or substantially reduce the exhausting of noxious, undesirable pollutants or wastes into the atmosphere.

A principal object of the present invention is to provide a filtering method for treating hot exhaust gases to reduce the emission of air pollutants which may cause or bring about the formation of smog or reduction of visibility, damage to vegetation and undesirable effects on human health.

Another object of the invention is to provide a filtering method for treating the fumes or exhaust gases of motor vehicles to reduce the emission of atmospheric pollutants and smog-forming materials.

Still another object of the invention is to provide an exhaust control filtering method using a siliceous material such as vermiculite treated with at least one salt of an organic acid.

Still another object of the invention is to provide an exhaust control filtering method using vermiculite treated with an alkali metal salt and/or an alkaline-earth metal salt of one or more organic acids.

Other objects of the invention will in part be obvious and will in part appear hereinafter.

This invention accordingly comprises a method involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing which illustrates one form or construction of a motor vehicle exhaust control filter usable in the invention.

The exhausts or emissions produced from the combustion of, for example, fuels such as gasoline, coal, oil, gas and the like contain appreciable quantities or concentrations of noxious, undesirable materials which become airborne when discharged into the surrounding atmosphere, thus contaminating or polluting the atmosphere. The airborne contaminants comprise gases and finely divided solid and liquid particles highly dispersed in the atmosphere. In many highly industralized areas and areas of high population density, the air-borne contaminants often produce a haze which varies in density with climatic conditions and the rate of air pollution. Due to the peculiar geographic and climatic conditions of some industrial and high population density areas, the airborne contaminants are frequently prevented or inhibited from dispersing and diffusing into the upper air strata, thus allowing the concentration of air-borne contaminants to build up in the atmosphere to such levels that the haze takes on the appearance of a relatively dense fog, commonly referred to as smog. Smog is objectionable not only because it reduces or interferes with visibility, but also because it damages plant life, cracks rubber and most importantly, undesirably affects human health such as, for example, causing irritation to the senses such as the eyes and nose.

It heretofore has been set forth that it is believed that the air-borne smog-producing pollutants or contaminants to a considerable extent comprise hydrocarbons, particularly unsaturated hydrocarbons, and nitrogen oxides, and that under the influence of sunlight, oxygen and ozone, there is formed undesirable derivatives, such as aldehydes, ozonides, and various organic acids which are irritating to mucous membranes of the body, such as the membrane of the eyes and respiratory system. When these contaminants are present in the atmosphere in concentrations sufficient to produce smog, eye and lung irritation can be severe and the health of the community can be endangered.

Exhaust fumes emitted from motor vehicles are believed to be one of the major contributors to the contamination or pollution of the atmosphere and responsible for most of the materials or chemicals for smog formation. In addition to appreciable concentrations of carbon monoxide, motor vehicle exhaust fumes also contain, among other things, substantial concentrations of particulates such as solid carbon, hydrocarbons and nitrogen oxides. As indicated above, the irritation of mucous membrane is believed to be due in great measure to the presence of undesirable organic derivatives produced by photosynthesis reactions involving primarily, air-borne nitrogen oxides and hydrocarbons, particularly unsaturated hydrocarbons. Moreover, it also is suspected that carcinogens or cancer-producers are among the many materials emitted in the exhaust of motor vehicles. Unsaturated hydrocarbons such as ethylene are also known to cause severe damage to vegetation. In view of the danger to human health from appreciable concentrations of carbon monoxide, carcinogens, and mucous irritating organic derivatives produced by solar irradiation reactions, damaging effects on vegetation, interference with visibility, and other undesirable effects, considerable effort has been expended in combatting atmospheric contamination and the photochemical smog problem. Moreover, because of the seriousness of the smog problem in certain areas with peculiar geographic and climatic conditions, legislation has been passed in many areas directed to controlling or abating the emission of smog-forming materials in the exhaust fumes or gases of motor vehicles. Generally most of the motor vehicle control devices proposed for preventing or substantially reducing the exhausting of smog-producing materials and other contaminants into the atmosphere are quite costly, while methods for treating the contaminated atmosphere to counteract or prevent the formation of smog are both costly and somewhat impractical. In the present invention there is provided an exhaust control filter which is not only economical, of simple construction and, if desired, replaceable, but also effective over prolonged periods of time in appreciably reducing the emission of smog-forming materials into the atmosphere.

According to the broader aspects of this invention, there is provided a filter body or composition for treating exhaust gases to reduce the concentrations of noxious materials whose presence in the atmosphere may be injurious to health and vegetation, and necessary for the formation of smog, said filter composition comprising a siliceous material such as vermiculite treated or impregnated with at least one salt of a carboxylic acid such as, for example, calcium formate. The filter composition is confined or enclosed within suitable means to provide an exhaust control device or filter.

Referring now to the drawing wherein there is illustrated one suitable construction of a motor vehicle control filter 10 comprising a hollow metallic cylindrical-shaped body or casing 12 having at one end a cover 14 provided with an exhaust gas inlet opening 16 defined by a cylindrical flange 18 which has an outwardly extending or directed portion 20 and an inwardly extending portion 22. At the other end of casing 12 there is provided an exhaust gas outlet opening 24 defined by a cylindrical, outwardly extending flange or neck 26. As shown, flanges 18 and 26, which are substantially parallel to the longitudinal walls of casing 12 and predeterminedly spaced therefrom, are adapted to engage and to be secured to, for example, tail pipe sections 28 and 30 respectively, of a motor vehicle exhaust system. Flanges 18 and 26 may be of such diameters so as to securely engage the tail pipe sections therewithin as illustrated or they may be of somewhat smaller diameters so as to closely fit within the tail pipe sections. Suitable means (not shown) such as detent means, clamp means or the like may be provided for adequately securing the outwardly extending flange portions and hence the filter 10 to the tail pipe sections.

Inwardly extending flange portion 22 is adapted to securely engage a removable and replaceable filter unit or cartridge 32 which is shown comprising an elongated hollow cylindrical body closed at one end and open at the other end. As shown, the cartridge is closed at the end which is to be located adjacent the outlet opening 24 and opened at the end which is to be adjacent inlet opening 16. The centrally disposed cavity 34 thus is in open communication with inlet opening 16. Preferably the diameter of the cavity 34 is at least equal to or greater than the diameter of the inlet opening 16. Filter cartridge 32 is provided with an outer wall 36 consisting of a perforated metallic web or screen and an inner wall 38 consisting of a metallic screen or mesh which defines cavity 34. The space between the walls is substantially tightly filled or packed with a filter composition or body 40 comprising a siliceous material such as vermiculite treated with at least one salt of a carboxylic acid. The size of the perforations or openings in the screen or mesh material may be varied considerably and will depend in large measure upon the particle size of the siliceous material employed as part of the filter media. The openings preferably will be a size sufficient to retain the treated siliceous material without unduly limiting the flow of exhaust gases. For example, with vermiculite with a particle size on the order of about one-eighth of an inch, wire of 20 or 30 mesh may be suitably employed. Moreover, different size screens or mesh materials may be employed for the outer and inner walls. For example, the outer wall may be constructed of, for instance, 30 mesh stainless steel wire while the inner wall may be constructed of say 20 mesh stainless steel wire.

For the proper positioning of cartridge 32, as well as for the engagement and securing of cartridge 32 to flange portion 22, cartridge 32 is provided with a metallic cylindrical, outwardly extending flange portion 42 at the mouth or opening of cavity 34. Interlocking means other than that shown for securely engaging the flange portion 42 with flange portion 22 may be employed. Likewise, the flange portion 42 may be of a size so as to be secured within flange portion 22 rather than as shown. Moreover, the cartridge 32 need not be secured to any portion of casing 12, cover 14 or flange 18 but may be secured directly to tail section 28. For instance, flange portion 22 may be eliminated while flange portion 42 may be of a suitable size and length so as to appropriately fit and be secured within tail section 28.

The filter cartridge 32 is of a somewhat smaller diameter and length than casing 12 so as to provide between casing 12 and the outer wall 36, a space 44 into which filtered exhaust gas may pass.

For ease in the removal and replacement of the filter cartridge 32, casing 10 and cover 14 are separated from one another. Although cover 14 is located at the gas inlet side, it should be noted that means permitting access to the interior of casing 12 and cartridge 32 may be provided elsewhere such as, for example, at the gas outlet side of casing 12.

Although the drawing illustrates a filter of a specific construction for a motor vehicle exhaust system, it should be understood, however, that filters of other suitable construction may be employed for treating motor vehicle exhaust fumes as well as exhaust fumes resulting from other operations. For instance, depending in large measure upon intended use, the size and shape of the casing 12 and filter cartridge 32 may be varied considerably. For example, instead of the specific cartridge construction described, there may be employed a plurality of disc-shaped cartridges of a diameter substantially equal to the inner diameter of casing spaced in parallel relationship along the length of the casing, or the cartridge may be substantially spiral in shape with a closed filter end portion or some other construction may be employed to provide a circuitous path so as to present a large surface area of filter composition for exposure or contact with exhaust gases. Likewise, the cartridge need not be removable and replaceable but rather the entire filter 10 may be that which is replaceable. In one form of this latter embodiment, the filter composition retained by suitable mesh material at the inlet and outlet openings of casing 12 may substantially completely fill the casing 12.

The filter 10 may be employed at any suitable location in the exhaust system of a motor vehicle. For example, the filter 10 can be incorporated into the exhaust system replacing the muffler, thus acting as a muffler and filter combination. Preferably, however, the filter 10 is employed in conjunction with a conventional muffler and is attached in the tail pipe section following the muffler. In one preferred embodiment the filter 10 is attached to the tail or very end of the exhaust system so as to not only be readily accessible and not require appreciable altering of the exhaust system, but also permit some cooling of the muffled exhaust gases before they enter the filter, and thus permit the filter to operate at lower temperatures so as to enhance the removal of the more volatile materials.

In the operation of filter 10 the hot exhaust gases emitted from the engine, after entering cavity 34, pass through the charge of filter composition into space 44 and then out through the remaining portion of the exhaust system into the atmosphere. Initially the filter charge is in a granular form. Frequently, after passing hot exhaust gases therethrough for a short period of time, the charge forms a "cake," that is the charge becomes a fused or bonded, highly porous mass. Little or no back pressure is developed during operation through the use of filter 10 nor is the performance of the motor vehicle interfered with or affected in any way.

Particulate material such as solid carbon is generally entrapped about the inner mesh wall and by the filter composition and thus removed from the exhaust gases. Other undesirable materials in the exhaust fumes are removed in appreciable quantities therefrom or are converted into less noxious or harmful materials by one or more physical and/or chemical mechanisms. For example, undesirable materials may be absorbed or adsorbed by the filter composition or enter into various chemical reactions in the presence of the filter composition.

The filter composition comprises a siliceous material treated or impregnated with at least one salt of a carboxylic acid. Preferably the siliceous material is a micaceous mineral such as vermiculite which is composed essentially of a hydrated silicate of indefinite composition (e.g., $MgO(FeAl)_2O_3$, $SiO_2$). The particles of vermiculite usually comprise a large number of superposed thin flat laminae which when suitably heated greatly expand. The particle size of the vermiculite employed may be varied over a wide range. Preferably the vermiculite granules utilized are of a size such that at least one dimension is no greater than about one-half an inch. Vermiculite granules of a particle size of about one-eighth of an inch have been found to be particularly suitable for use in motor vehicle exhaust control filters.

In conjunction with the siliceous material there is utilized at least one salt of an organic acid. The term "organic acid" refers to organic compounds which contain one or more carboxylic groups. The salt may be of an alkali metal such as sodium, lithium, potassium or the like or an alkaline-earth metal such as calcium, strontium, barium, magnesium etc., or other metal such as, for example, cadmium, chromium, aluminum, iron, copper, zinc, lead, manganese, tin and the like. Ammonium salts may also be employed. Preferably, the siliceous material is treated with an alkali metal salt and/or alkaline earth metal salt of at least one carboxylic acid. For instance, the preferred vermiculite may be treated with sodium formate or calcium formate or a mixture of both salts.

The salts of a wide variety of carboxylic acids may be employed. For example, there may be utilized salts of saturated normal and branched aliphatic monobasic or monocarboxylic acids such as formic, acetic, etc., or unsaturated aliphatic monocarboxylic acids such as the acrylics and the like. Monocarboxylic acids of cyclic compounds, for example, carboxylic acids of carbocyclic and heterocyclic compounds such as benzoic acid and the like, may also be used. Additionally, there may be employed aliphatic saturated and unsaturated dicarboxylic acids such as oxalic, malonic, maleic, fumaric, etc. Aliphatic polycarboxylic acids containing more than two carboxyl groups may also be suitable. Polycarboxylic acids of cyclic systems, for example, of carbocyclic and heterocyclic systems such as the several phthalic acids and the like may also be utilized. Other acids which may be employed are aldehydic acids such as, for example, glyoxylic acid; keto acids, such as, for example, pyruvic acid; hydroxy acids such as, for example, glycolic acid, lactic acid, etc., and amino acids such as, for example, glycine and the like. In one preferred embodiment, there is employed at least one salt of an aliphatic monocarboxylic acid and, in particular, an alkali metal salt and/or an alkaline-earth metal salt of at least one lower fatty acid such as formic, acetic, propionic, butyric and the like. Suitable salts thus may comprise calcium formate, sodium formate, etc. As indicated, the salt of more than one carboxylic acid may also be employed. For example, the preferred vermiculite may be treated with a mixture of sodium formate and sodium acetate or with a mixture of sodium formate and say calcium acetate.

Treatment or impregnation of the siliceous material is achieved by contacting the siliceous material with a solution containing one or more of the desired salts. Preferably, the salt or salts employed are water-soluble and the siliceous material is treated with an aqueous solution thereof. The quantity of solution employed should be such that it is substantially completely taken up by a given quantity of siliceous material so as to provide a granular filter composition or body which is readily and easily handled and utilized. The siliceous material may be treated or impregnated with a wide range of concentrations of the desired salt or salts. Thus, solutions containing from about 2 percent by weight to solutions substantially saturated with one or more salts of one or more carboxylic acids may be employed. It should also be mentioned that in addition to the use of preformed salts, the desired salt or salts of one or more carboxylic acids may be produced or formed in situ, that is, produced in the presence of or in contact with the siliceous material.

It has been found that filter compositions as disclosed above and particularly compositions comprising vermiculite treated with an alkali metal salt and/or an alkaline metal salt of a lower fatty acid, e.g., sodium formate or calcium formate or a mixture of both or a hydroxy acid, e.g., sodium glycolate or calcium glycolate or a mixture of both were effective over long periods of time in appreciably reducing the concentrations of smog-forming materials in motor vehicle exhaust gases emitted into the atmosphere.

Since certain changes may be made in the above process, compositions and products without departing from the scope of the invention herein involved, it is intended that all matter contained in the above description, or shown in the accompanying drawing, shall be interpreted as illustrative and not in a limiting sense.

What is claimed is:
1. A method for treating exhaust gases produced by the combustion of a fuel to reduce the emission of noxious materials into the atmosphere which comprises passing said exhaust gases through a filter composition comprising vermiculite treated with at least one salt selected from the group consisting of the alkali metal salts and the alkaline-earth metal salts of an aliphatic carboxylic acid having less than five carbon atoms.
2. The method of claim 1 wherein said filter composition comprises vermiculite treated with sodium formate.
3. The method of claim 1 wherein said filter composition comprises vermiculite treated with calcium formate.
4. The method of claim 1 wherein said filter composition comprises vermiculite treated with a mixture of sodium formate and calcium formate.

References Cited by the Examiner

UNITED STATES PATENTS

| | | | |
|---|---|---|---|
| 2,341,016 | 2/44 | Brubaker | 252—431 |
| 2,920,718 | 1/60 | Howell et al. | 55—524 |
| 2,975,586 | 3/61 | Bray | 55—387 |
| 2,978,064 | 4/61 | Deaver | 55—387 |
| 2,979,157 | 4/61 | Clark | 55—387 |
| 3,000,692 | 9/61 | Duncan et al. | 23—2.2 |
| 3,015,368 | 1/62 | Reid | 55—387 |
| 3,067,560 | 12/62 | Parker | 55—387 XR |

OTHER REFERENCES

Ser. No. 382,663, Berg et al. (A.P.C.), published May 25, 1943.

HARRY B. THORNTON, *Primary Examiner.*

REUBEN FRIEDMAN, EUGENE BLANCHARD, *Examiners.*